United States Patent
Ricks et al.

(10) Patent No.: US 11,592,672 B2
(45) Date of Patent: Feb. 28, 2023

(54) OPTICAL ENGINE FOR HEAD-MOUNTED DISPLAY APPARATUS

(71) Applicant: Six15 Technologies, Henrietta, NY (US)

(72) Inventors: Theodore K. Ricks, Pittsford, NY (US); Rene Alexander Zickafoose, Scottsville, NY (US)

(73) Assignee: Six15 Technologies, Henrietta, NY (US)

( * ) Notice: Subject to any disclaimer, the term of this patent is extended or adjusted under 35 U.S.C. 154(b) by 221 days.

(21) Appl. No.: 17/101,058

(22) Filed: Nov. 23, 2020

(65) Prior Publication Data

US 2021/0173213 A1    Jun. 10, 2021

Related U.S. Application Data

(60) Provisional application No. 62/944,028, filed on Dec. 5, 2019.

(51) Int. Cl.
    *G02B 27/01*    (2006.01)
    *G02B 27/28*    (2006.01)

(52) U.S. Cl.
    CPC ..... *G02B 27/0172* (2013.01); *G02B 27/0176* (2013.01); *G02B 27/283* (2013.01); *G02B 2027/011* (2013.01); *G02B 2027/0178* (2013.01)

(58) Field of Classification Search
    USPC ........................................... 359/485
    See application file for complete search history.

(56) References Cited

U.S. PATENT DOCUMENTS

| | | | |
|---|---|---|---|
| 6,023,372 A | 2/2000 | Spitzer | |
| 6,868,360 B1 * | 3/2005 | Olstad | G01C 17/18 |
| | | | 702/92 |
| 2019/0250400 A1 | 8/2019 | Ricks | |

\* cited by examiner

*Primary Examiner* — Collin X Beatty
*Assistant Examiner* — Grant A Gagnon
(74) *Attorney, Agent, or Firm* — Louis S. Horvath

(57) ABSTRACT

A display apparatus has a display to emit image-bearing light to a prism assembly that defines an optical path between an incident surface of the prism assembly and an output surface that is orthogonal to within +/−30 degrees relative to the incident surface, wherein the prism assembly has a curved reflective surface opposite the incident surface. The prism assembly encases a beam splitter at an oblique angle to the defined optical path and to both the incident and the output surface of the prism assembly. A shim, in contact against the display surface and against the incident surface of the prism assembly, defines a sealed air gap for light between the display surface and the incident surface. A frame houses the display, the shim, and the incident surface of the prism assembly, wherein the frame further provides connection features for coupling the apparatus to a head-worn article.

19 Claims, 6 Drawing Sheets

OPTICAL ENGINE FOR HEAD-MOUNTED DISPLAY APPARATUS

CROSS REFERENCE TO RELATED APPLICATIONS

The present application claims the benefit of U.S. Provisional application Ser. No. 62/944,028, provisionally filed on Dec. 5, 2019 entitled "OPTICAL ENGINE FOR HEAD-MOUNTED DISPLAY APPARATUS" in the names of Theodore K. Ricks et al., incorporated herein by reference in its entirety.

FIELD OF THE INVENTION

The present disclosure relates generally to wearable display devices and more particularly to an optical assembly for a head-mounted display that provides generated image content at a finite focal distance.

BACKGROUND OF THE INVENTION

A number of solutions have been proposed for providing image content from wearable devices. Various types of eyewear apparatus have been described for displaying image content to a viewer. In some cases, these devices may be completely immersive, so that the viewer sees only images generated by the apparatus and has no ability to see the outside world when wearing the device, thus providing virtual reality (VR) display. However, there are many applications for which high degrees of visibility of the real world are of value, with generated images or messages presented in an unobtrusive manner, such as along the edge of the visual field or visually superimposed against the real-world image content. Systems providing this capability are termed augmented reality (AR) or mixed reality displays.

Wearable display devices offer considerable promise for providing information and displaying complementary imagery that can improve safety, performance, and efficiency in a number of fields, including military, industrial, and medical applications, for example. These devices can help to direct a viewer to a particular task and to enhance a viewer's understanding of visual content that lies in the field of view.

However, with many of the apparatus that have been proposed for wearable displays, the viewer is encumbered by the device in some way; this can be due to device size, bulkiness and discomfort, component and image positioning, poor see-through visibility, poor image quality, eye fatigue, and other difficulties. Although many solutions for providing a more natural viewing experience have been outlined, and a number of advances toward improved image quality have been introduced, design factors may not be suitable for the intended use. For example, weight or form factors for many of these solutions may make it difficult to win broad-based acceptance for these devices, particularly for long-term use, or for demanding functions such as military or police applications.

One problem that is widely acknowledged in the art relates to adaptability of systems to different mounting arrangements. Design approaches tend to be highly customized. Display optics that work well for some types of head-mounted devices (HMDs) may not be well suited for use with other types. Optical systems are often configured for specific types of headgear and, in general, are not readily adaptable for use with multiple mounting geometries.

Thus, it can be appreciated that it would be advantageous to provide a display engine that can be adapted for configuration with any of a number of different types of head-mounted devices, allowing for different mounting and protective arrangements and well-suited for use with auxiliary devices.

SUMMARY OF THE INVENTION

It is an object of the present disclosure to advance the art of head-mounted display. With this object in mind, the present disclosure provides a display apparatus comprising:
  a) a display that is energizable to emit image-bearing light from a display surface;
  b) a prism assembly that defines an optical path for conveyance of the emitted image-bearing light,
    wherein the optical path within the prism extends between an incident surface of the prism assembly and an output surface that is orthogonal to within +/−30 degrees relative to the incident surface,
    wherein the prism assembly has a curved reflective surface for light focusing, opposite the incident surface,
    and wherein the prism assembly encases a beam splitter disposed at an oblique angle to the defined optical path within the prism assembly and to both the incident surface and the output surface of the prism assembly;
  c) a shim in contact against the display surface and against the incident surface of the prism assembly, wherein the shim defines a sealed air gap for conveying the image-bearing light between the display surface and the incident surface; and
  d) a frame that houses the display, the shim, and the incident surface of the prism assembly,
    wherein the frame further provides one or more connection features for coupling the display apparatus to a head-worn article.

These and other aspects, objects, features and advantages of the present disclosure will be more clearly understood and appreciated from a review of the following detailed description of the preferred embodiments and appended claims, and by reference to the accompanying drawings.

BRIEF DESCRIPTION OF THE DRAWINGS

The foregoing and other objects, features, and advantages of the disclosure will be apparent from the following more particular description of various embodiments, as illustrated in the accompanying drawings.

The elements of the drawings are not necessarily to scale relative to each other.

DETAILED DESCRIPTION OF THE INVENTION

Figure 1A:
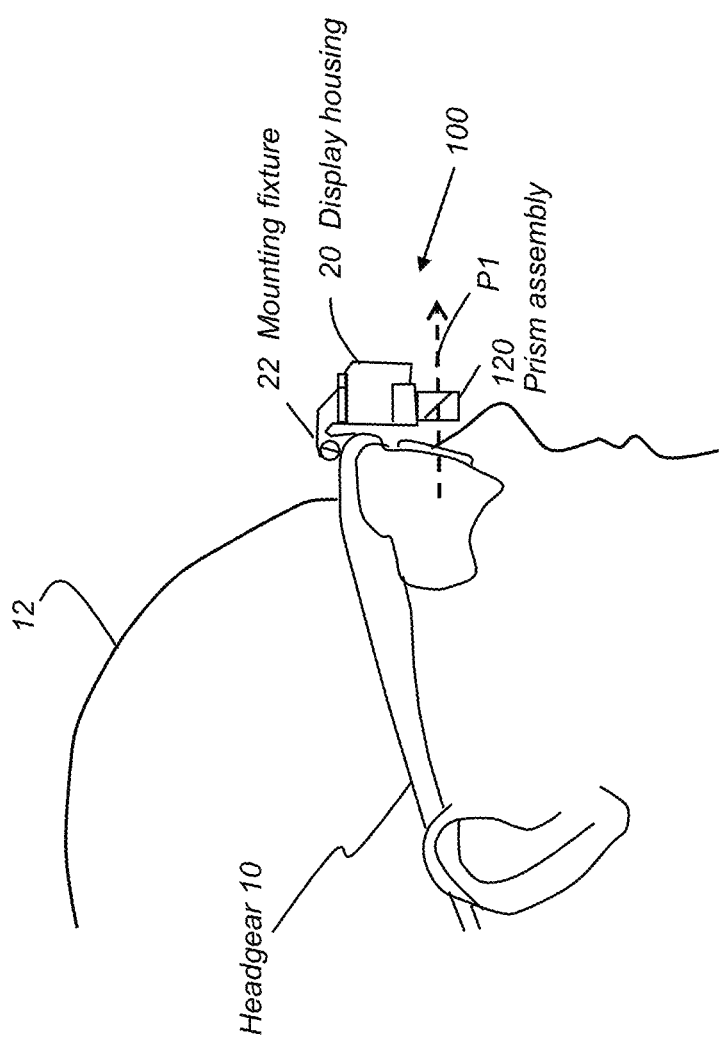
FIG. 1A is a side view that shows components and a light path in a head-mounted application.

The present description is directed in particular to elements forming part of, or cooperating more directly with, apparatus in accordance with the invention. It is to be understood that elements not specifically shown or described may take various forms well known to those skilled in the art.

Figures shown and described herein are provided in order to illustrate key principles of operation and component relationships along their respective optical paths according to the present disclosure and are not drawn with intent to show actual size or scale. Some exaggeration may be necessary in order to emphasize basic structural relationships or principles of operation or simply in order to fit components within the available space on the page. Some conventional components that would be needed for implementation of the described embodiments, such as various types of optical mounts, for example, are not shown in the drawings in order to simplify description of the disclosure itself. In the drawings and text that follow, like components are designated with like reference numerals, and similar descriptions concerning components and arrangement or interaction of components already described are omitted. Where they are used, the terms "first", "second", and so on, do not denote any ordinal or priority relation, but are simply used to more clearly distinguish one element from another.

In the context of the present disclosure, the term "energizable" describes a component or device that is enabled to perform a function upon receiving power and, optionally, upon also receiving an enabling signal.

In the context of the present disclosure, positional terms such as "top" and "bottom", "upward" and "downward", and similar expressions are used descriptively, to differentiate different surfaces or views of an assembly or structure and do not describe any necessary orientation of the assembly in an optical apparatus. The terms "upstream" and "downstream" as used herein have their conventional usage and refer to relative positions of light or light-conditioning or redirecting components as the light proceeds along an optical path.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components.

In the context of the present disclosure, the terms "user", "wearer", and "viewer" may be considered equivalent when referring to the person wearing the display apparatus described herein.

In the context of the present disclosure, the term "head-worn article" can include various types of headgear, including head mounts, helmets, hard-hats, hats, caps, visors, and protective hoods, as well as eyeglasses, goggles, face shields, and various types of eyewear that seat against the viewer's head, with support along the sides or top of the viewer's head.

The term "oblique" or "oblique angle" has its conventional meaning, as relating to an angular relationship that is either greater than or less than a right (90 degree) angle and not parallel with respect to its reference, that is, not an integer multiple of 90 degrees. An oblique angle is considered to be an angle that differs from the nearest multiple of 90 degrees by more than 4 degrees.

Two geometric features, such as lines or planes, are considered to be substantially parallel if they are parallel to within 4 degrees or less. Two geometric features, such as lines or planes, are considered to be substantially orthogonal if they are orthogonal to within 4 degrees or less.

The term "optical axis" has its conventional meaning for embodiments described subsequently. With rotationally symmetrical optics, the optical axis simply corresponds to the axis of rotational symmetry. However, with asymmetric optics, the optical axis is more generally defined as the path taken by a ray that is centered in the aperture of the light-concentrating optical component. For cylindrical optics, there may be an axis of symmetry with respect to a plane; this may or may not correspond to the optical axis. With a cylindrical optical device, the optical axis is in the plane where there is perceptible optical power orthogonal to the direction along which the cylindrical device is extended. For clarity, the term optical axis is used in the following description as relative to a single refractive or reflective optical component, rather than relative to the larger optical system that comprises multiple components. The more general term "optical path" is used herein to describe the path taken by a particular beam of light, from one component to the next in the optical system of the present disclosure.

With relation to dimensions given herein, the term "substantially" means within better than +/-12% of a geometrically exact dimension. Thus, for example, a first dimensional value is substantially half of a second value if it is in the range of from about 44% to about 56% of the second value. Positions in space are "near" each other or in close proximity when, relative to an appropriate reference dimension or distance such as a radius of curvature, distance from a focal point, a component location, or other point on an optical axis, distance dimensions are substantially the same, no more than about 12% apart, preferably within 5% or 1% or less distance from each other.

In the context of the present disclosure, a hermetic seal bonds two surfaces against each other to prevent ingress of moisture or particulate between the surfaces. Methods of hermetic sealing for silicon-to-metal surfaces are known to those skilled in the mechanical arts as are methods of hermetic sealing for glass-to-metal surfaces.

The term "prism" or "prism element" is used herein as it is understood in optics, to refer to a transparent optical element that is generally in the form of an n-sided polyhedron with flat surfaces upon which light from an external source is incident, or from which surfaces light exits, and that is formed from a transparent, solid material that refracts light. It is understood that, in terms of shape and surface outline, the optical understanding of what constitutes a prism is less restrictive than the formal geometric definition of a prism and encompasses that more formal definition. Moreover, the term "prism" may be used to describe a single, monolithic piece of substrate or to describe an assembly that is optically monolithic and may have separate prisms bonded together to convey light in the manner of a monolithic structure. A "mechanically monolithic" prism can be formed using an arrangement of prisms of the same material that may be cemented together or otherwise in optical contact with each other so as to form a single unit; alternately, the prism assembly may be mounted to have a fixed air gap between separate prism elements. Lensing features for converging or diverging light can be bonded to prism surfaces or formed into input or output surfaces.

Viewing devices for AR and other applications are preferably lightweight and compact, and offer a low profile, suitable for mounting on a helmet or other headgear. Among particularly desirable optical characteristics for AR display that relate to image quality for both synthesized image content and the real-world field of view (FOV) are the following:
(i) Good resolution.
(ii) Suitable contrast and brightness.
(iii) Visibility of real-world content. This means minimizing obstruction of the real-world FOV while at the same time providing generated image content of suitable quality for interpretation or readability.
(iv) Minimum of display-generated image artifacts such as streaks, bands, ghost images, or color fringes.

Embodiments of the present disclosure provide an optical engine, that is, a set of components that cooperate to form a beam of image-bearing light, wherein the optical engine is configured for ready adaptability to various types of headgear worn by a viewer. By way of example, the side view of FIG. 1A shows headgear 10, such as a pair of safety glasses, on a viewer 12 having an optical imager assembly or optical engine 100 mounted thereon. Optical imager 100 suspends a prism assembly 120 into the FOV of viewer 12 along an optical path P1 that lies along the line of sight or visual axis. Optical engine 100 is fitted within a display housing 20 and is mounted from a mounting fixture 22 on headgear 10.

The head-worn article, may or may not be protective headgear and can, in a very general aspect, be any type of eyewear or head covering capable of providing sufficient structural strength for supporting mounted displays or other optical components in accordance with the present disclosure. In various embodiments, headgear 10 can be designed for military, industrial, medical support, or recreational use, for example.

Figure 1B:
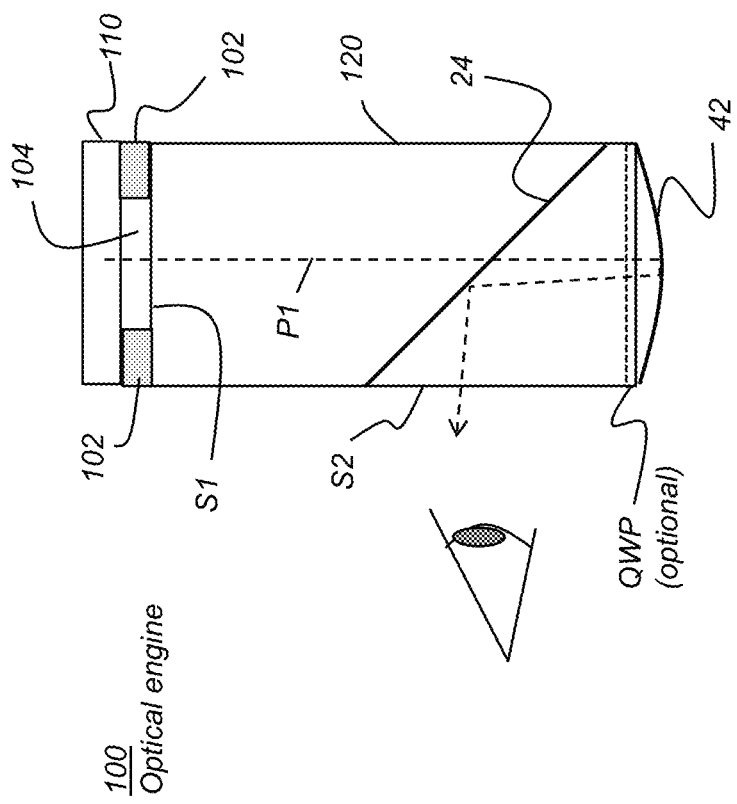
FIG. 1B is a side schematic view of the optical engine according to an embodiment.

FIG. 1B is a side schematic view of optical engine 100 that can be used for augmented reality or mixed reality display according to an embodiment of the present disclosure. Optical path P1 extends between incident surface S1 of prism assembly 120 and an output surface S2 that is orthogonal to within +/−30 degrees relative to incident surface S1. A beam splitter 24 is encased within prism assembly 120, disposed at an oblique angle to optical path P1 and to both the incident surface and the output surface. Image-bearing light emitted from a display 110 surface is projected through an air gap 104 into prism assembly 120 and transmits through beam splitter 24, toward a curved reflective surface 42. Surface 42 magnifies the image and a portion of the reflected light reflects toward the viewer from beam splitter 24.

Prism assembly 120 may be made of any material suitable for light conveyance, such as optical grade glass or plastic, such as N-BK7, having sufficient geometries and refractive qualities to be suitable for optics applications. Prism assembly 120 can support internal reflection for conveyance of image-bearing light. Prism assembly 120 can be a single, mechanically monolithic optic or a compound prism, formed from a number of prisms in optical contact with each other, but not otherwise bonded together to form a mechanically monolithic optic. Various surface coatings, such as an anti-reflective (AR) coating, can be provided.

Display 110 can be any type of device that emits light and projects an image, such as but not limited to an emissive, electroluminescent, transmissive, transflective, or reflective display. For example, the display may be a liquid crystal display (LCD), an organic light-emitting diode (OLED), a micromirror array or digital light processor (DLP), or a liquid crystal on silicon (LCOS) display, and may be backlit or frontlit as appropriate. In certain embodiments, the display may be on the micro-, pico- or nano-scale. Further, the display may provide static images (such as but not limited to still photographs, images and text) or dynamic images (such as but not limited to videos). The display may include a projector (such as but not limited to a picoprojector) and at least one light source (such as but not limited to light-emitting diodes LEDs). The display may be energizable to generate light by any suitable method, including but not limited to electrically, photonically and chemically.

Beam splitter 24 can be a 50/50 beam splitter; alternately, beam splitter 24 can be a polarization beam splitter that uses form birefringence, such as a wire grid beam splitter from MOXTEK, Inc. of Orem, Utah, or can have some other suitable polarizing coating or film, with a quarter wave plate (QWP) added between beam splitter 24 and surface 42 in the optical path. Beam splitter 24 can be formed on a separate plate or can be formed by coating onto a prism surface. Adhesive bonding or non-adhesive bonding methods can be used to form prism assembly 120 as a unitary or mechanically monolithic module. Hydroxide bonding, frit bonding, and optical contact bonding methods can alternately be used for forming a composite prism that can be handled and used as a single unit and is thus mechanically monolithic, as described previously. Quarter wave plate QWP can be encased within prism assembly 120, such as bonded between a planar prism surface and a plano surface of a bonded lens that is treated to provide reflective surface 42.

For a number of applications, curved reflective surface 42 can be designed to form an image with a comfortable viewing distance, such as, but not limited to, within the range of 1.5-2.5 meters, for example. Embodiments of the present disclosure also allow modification of surface 42 curvature and/or of prism materials so that the viewing distance is adjusted to nearer than 1.5 meters or exceeding 2.5 meters, according to the needed working distance of the viewer. Curvature can also be used to provide optical power to the input surface S1 that received incident light.

Further optical correction can be performed by lenses bonded, suspended in front of, or formed on light incidence or exit (output) surfaces of prism assembly 120. Reflective surface 42 provides full or partial reflectance of light rays and may be substantially planar or variably curved to provide suitable levels of optical power. In embodiments shown herein, reflective surface 42 is slightly curved in a concave direction to focus the reflected image-bearing light. Any suitable amount or degree of curvature may be employed. The particular curvature of reflective surface 42 is related to field of view for the generated image content, with less curvature supporting a smaller field of view, and larger curvatures supporting proportionally larger fields of view. For example, reflective surface 24 may have a radius of curvature in the range of 30-50 mm in some embodiments, although both larger and smaller curvatures are also contemplated, depending on at least the desired field of view, dimensions of the optics, length and angle of beam splitter 24, and distance from the display 110. Reflective surface 24 may include a coating to achieve or enhance reflectance, which may be any reflective material such as, but not limited to, metals like protected aluminum, chrome, and silver, for example, or can be formed with other coating materials. Reflective surface 24 may form a boundary of prism assembly 120, opposite incident surface S1.

Figure 2:
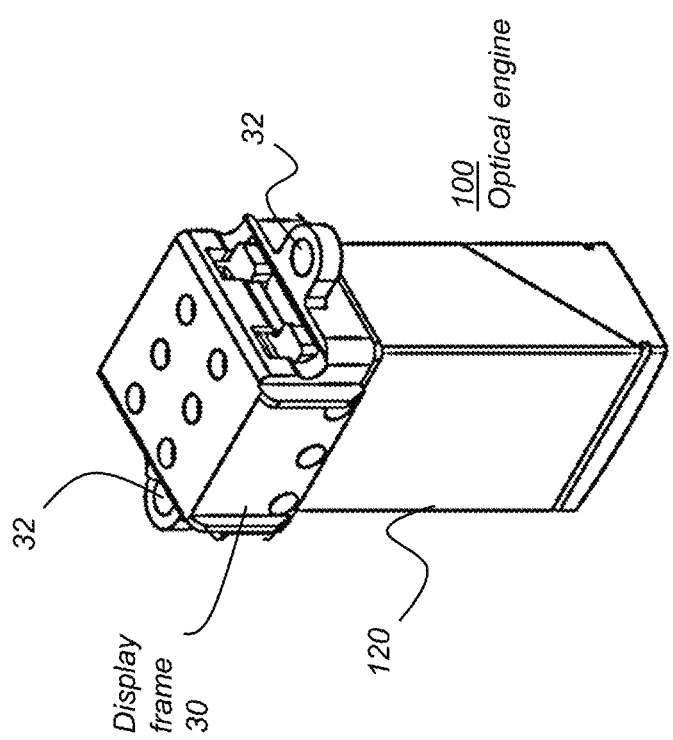
FIG. 2 is a perspective view showing the optical engine according to an embodiment of the present disclosure.

FIG. 2 is a perspective view showing optical engine 100, according to an embodiment. A display frame 30 provides one or more connection features 32, such as fastener holes, for mounting within display housing 20 (FIG. 1A). Display 110 signal connections are accessible through display frame 30, allowing power and imaging signals to be communicated for image generation.

Figure 3:
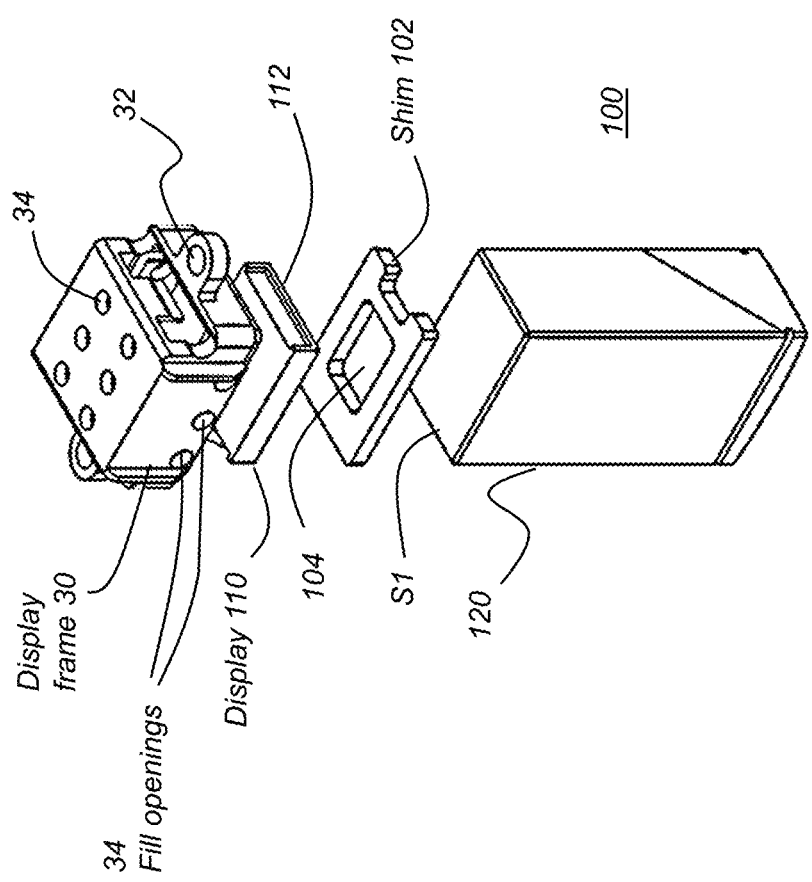
FIG. 3 is an exploded view showing components of the optical engine.

FIG. 3 is an exploded view showing components of optical engine 100. Display frame 30 houses the display 110, a shim 102, and incident surface S1 of the mechanically monolithic prism assembly. Air gap 104 is sealed between a surface 112 of display 110 and incident surface S1 of prism assembly 120. According to an embodiment of the present disclosure, a glass-to-metal hermetic bond can be used for shim surfaces, both between shim 102 and incident surface S1 and between shim 102 and display surface 112. Shim 102 can also serve as a spacer, without hermetic sealing techniques. An optional air-tight seal for air gap 104 can be provided by the structure and proper sealing of frame 30, housing the shim 102 and display 110 and prism 120 incident surfaces.

Shim 102 can provide a mechanism for adjustment to correct for some tolerance variation in optical assembly, in order to provide an image presented to a viewer with an effective viewing distance within a viewing range of less than 3 meters, such as a range of 2.25+/−0.75 meters or 1.5+/−0.5 meters. As part of the fabrication process, the optical engine 100 can present an image using a given shim 102 and the presented image can be measured for preferred viewing distance. A substitute or added shim can be selected to replace or supplement the initial shim 102 to adjust for manufacturing errors and to provide consistent viewing distances between assemblies. The shim can be a single apertured piece or can be formed of multiple components.

As noted earlier, one or more surfaces of the prism assembly 120 can have optical power, such as having curvature to provide lenses for magnification or vision correction. Surfaces can include coatings to reduce reflection or to provide filtering or polarization of transmitted light.

Optical engine 100 can be particularly suitable as a sealed module that can be mounted in any of a number of arrangements and provides the needed connections for display generation from external source signal content. According to an embodiment, no adhesives are needed in the optical path. Sealants provided for securing display frame 30 to its contained components can include various rigid sealants or elastomers, for example. Sealants can be thermally conductive. Sealant can be injected through one or more fill openings 34 (FIG. 3), for example.

Frame 30 can be formed of metal and can help to provide a mechanism for dissipating thermal energy from display 110. Shim 102 can similarly be metal to provide enhanced thermal conductivity. Alternately, frame 30 and other structural materials can be formed from insulating materials having relatively low thermal conductivity.

Using the arrangement shown in FIG. 3, the combined stack of components, including incident surface S1, shim 102, and display surface 112, can be sealed within display frame 30 for protection from ingress of moisture and particulates. According to an embodiment of the present disclosure, sealing provided for this combined stack is in conformance with IP65, established by the International Electrotechnical Commission (IEC) and familiar to those skilled in the design and fabrication arts for devices such as smart phones and smart watches, for example. According to further embodiments of the present disclosure, sealing provided for this combined stack is in conformance with IP67 or IP68, established by the International Electrotechnical Commission (IEC) and also familiar to those skilled in the design and fabrication arts for wearable and hand-held devices such as smart phones and smart watches, for example.

Figure 4B:
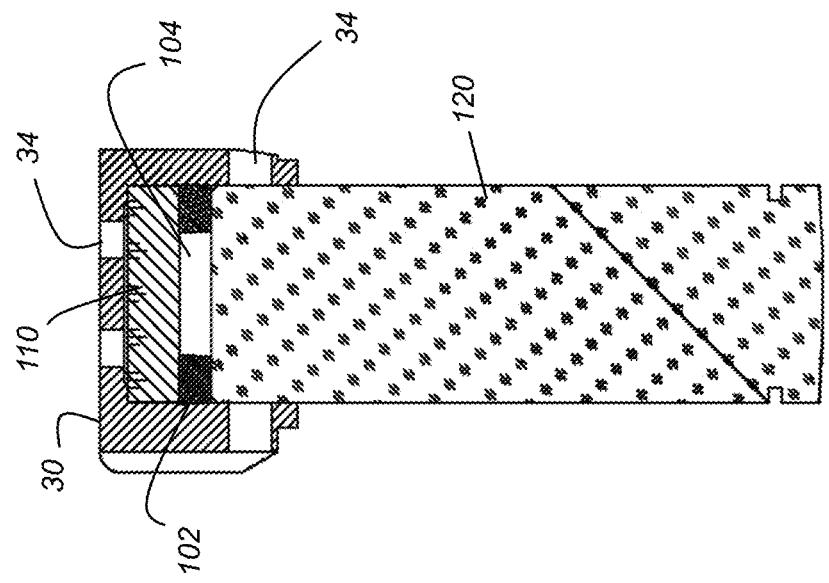
FIGS. 4A and 4B show plan and cross-sectional side views, respectively, of the optical engine, with assembly details.
Figure 4A:
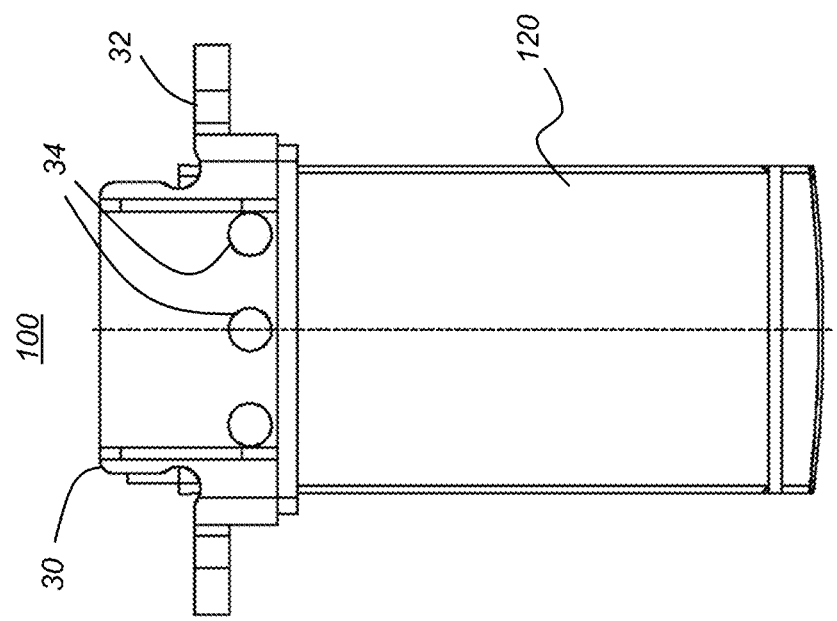

FIGS. 4A and 4B show plan and cross-sectional side views, respectively, of optical engine 100 with assembly details. Fill openings 34 on the top of optical engine 100, as pictured, can permit air to escape the cavity and accept adhesives to form a thermally conductive bond for display 110 to frame 30. Fill openings 34 along sides of optical engine 100 can accept adhesive or sealant for securing display frame 30 to side edges of prism assembly 120. In the embodiment shown in FIGS. 4A, 4B, the function of fill openings 34 is structural and relates to bonding the frame to the display and prism assembly.

Figure 6:
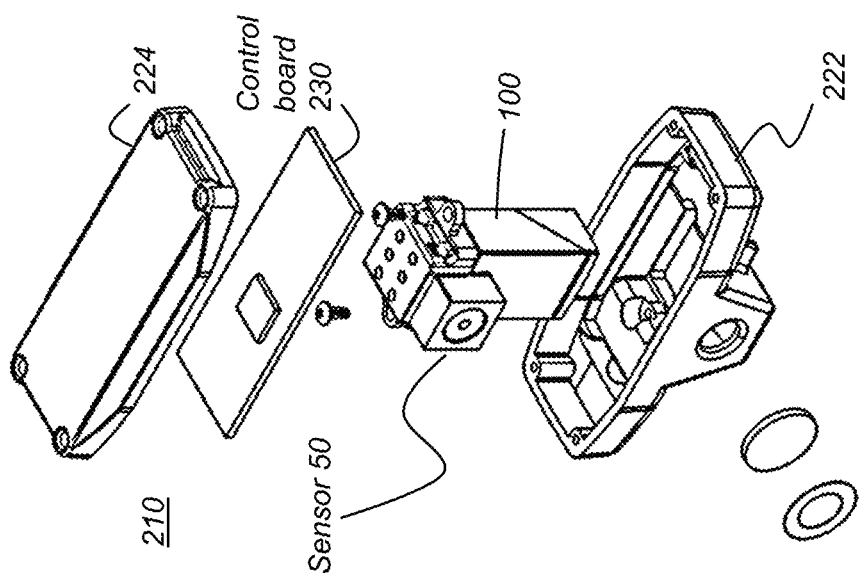
FIG. 6 is an exploded view showing exemplary components for the sealed display apparatus shown in FIG. 5.
Figure 5:
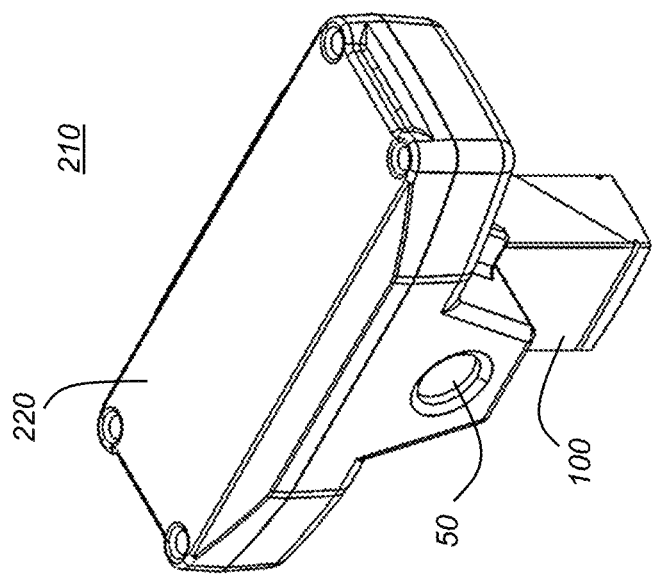
FIG. 5 is a perspective view that shows an exemplary embodiment with an optical engine mounted as part of a sealed display apparatus according to an embodiment.

FIG. 5 shows an exemplary embodiment with optical engine 100 mounted as part of a sealed display apparatus 210 according to an embodiment. FIG. 6 is an exploded view showing exemplary components for sealed display apparatus 210. An optional sensor 50, such as a camera or inertial sensor, for example, can be packaged with optical engine 100. A sealed housing 220 has a top portion 224 and a bottom portion 222 that provide mounting and protection for optical engine 100 and sensor 50 and any associated filters, lenses, or other light-conditioning elements. An optional control board 230 or other circuitry can also be fitted into housing 220. Control board 230 can have its component surface in a plane that is parallel to the line of sight and orthogonal to the path of light emitted from display 110.

Display apparatus 210 in an embodiment can have various types of interface and power cables for supplying power and signals to the optical engine 100. An interface cable can support a standard communications protocol, such as using USB 2.0 or 3.0 format for example, which permits bidirectional communication and power transmission to a head mounted display at speeds that can support video transmission, for example, providing images to either the right or left eye of a viewer.

It is useful to provide a head mount module selectively attachable to a head mount so as to be disposed across the forehead of the user and attachable in front of either eye, having a light emitting display, control means for said light emitting display, a vertical optical element that presents an image with distance correction when positioned in front of an eye.

A display apparatus has a monolithic prism assembly that defines an optical path for image-bearing light between an incident surface and an output surface that is orthogonal to within +/−30 degrees relative to the incident surface, wherein the optical path can be free of optical adhesives. A display is energizable to direct image-bearing light from a display surface toward the incident surface of the monolithic prism assembly. A shim is disposed between the display and the incident surface of the monolithic prism assembly, wherein the shim defines a sealed air gap between the display surface and the incident surface. A frame houses the display, the shim, and the incident surface of the monolithic prism assembly, wherein the frame further provides one or more connection features for mounting the display apparatus to a head-worn device. The display can be an OLED.

The frame can be adhesively coupled to the display. The frame can be adhesively coupled to the prism assembly. The frame can seal the display surface, the shim, and the incident light surface from moisture and particulate ingress. The shim can be hermetically coupled to the incident surface of the prism assembly and to the display surface. The shim can be formed of metal. Surfaces of the prism assembly can be configured to provide lensing of the image-bearing light. Surfaces of the prism assembly can be coated to provide filtration or polarization of transmitted light.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

The invention claimed is:

1. A display apparatus comprising:
a) a display that is energizable to emit image-bearing light from a display surface;
b) a prism assembly that defines an optical path for conveyance of the emitted image-bearing light, wherein the optical path within the prism extends between an incident surface of the prism assembly and an output surface that is orthogonal to within +/−30 degrees relative to the incident surface, wherein the prism assembly has a curved reflective surface for light focusing, opposite the incident surface, and wherein the prism assembly encases a beam splitter disposed at an oblique angle to the defined optical path within the prism assembly and to both the incident surface and the output surface of the prism assembly;
c) a shim in contact against the display surface and against the incident surface of the prism assembly, wherein the shim defines a sealed air gap for conveying the image-bearing light between the display surface and the incident surface; and
d) a frame that houses the display, the shim, and the incident surface of the prism assembly, wherein the frame further provides one or more connection features for coupling the display apparatus to a head-worn article.

2. The apparatus of claim 1 wherein the display is an electroluminescent display.

3. The apparatus of claim 1 wherein the display is a micromirror array.

4. The apparatus of claim 1 wherein the beam splitter is a polarization beam splitter.

5. The apparatus of claim 4 further comprising a quarter wave plate between the beam splitter and the curved reflective surface in the optical path.

6. The apparatus of claim 1 wherein the prism assembly is formed using non-adhesive bonding.

7. The apparatus of claim 1 wherein the shim is bonded to the display surface using a glass-to-metal hermetic bond.

8. The apparatus of claim 1 wherein the shim is bonded to the incident surface of the prism assembly using a glass-to-metal hermetic bond.

9. The apparatus of claim 1 wherein the incident surface of the prism is formed to have optical power.

10. The apparatus of claim 1 wherein the frame provides one or more openings for sealant fill.

11. A method comprising:
a) forming a prism assembly that defines an optical path from an incident surface to an output surface that is orthogonal to within +/−30 degrees relative to the incident surface, wherein the prism assembly has a curved reflective surface opposite the incident surface, and wherein the prism assembly encases a beam splitter disposed at an oblique angle to the defined optical path within the prism assembly and to both the incident surface and the output surface of the prism assembly;
b) defining a sealed air gap between a display and the incident surface by bonding a shim to the incident surface and to a display surface;
c) mounting the display, the shim, and the incident surface of the prism assembly within a frame that leaves the output surface of the prism assembly exposed; and
d) coupling the display apparatus to a head-worn article.

12. The method of claim 11 wherein mounting within the frame further comprises applying a sealant to openings in the frame.

13. The method of claim 11 further comprising adjusting dimensions of the defined sealed air gap by replacing the shim.

14. A display apparatus comprising:
a) a display that is energizable to emit image-bearing light from a planar display surface;
b) a prism assembly that defines an optical path for conveyance of the emitted image-bearing light, wherein the optical path extends between an incident surface of the prism assembly and an output surface that is orthogonal to within +/−30 degrees relative to the incident surface, wherein the prism assembly has a concave reflective surface opposite the incident surface, and wherein the prism assembly encases a wire-grid polarization beam splitter disposed at an oblique angle to the defined optical path within the prism assembly and to both the incident surface and the output surface of the prism assembly and further has a quarter wave plate in the optical path between the beam splitter and the concave reflective surface;
c) a shim bonded to the display surface and to the incident surface of the prism assembly, wherein the shim defines a sealed air gap of the optical path between the display surface and the incident surface; and
d) a frame that houses the display, the shim, and the incident surface of the prism assembly, wherein the frame further provides one or more connection features for coupling the display apparatus to a head-worn article.

15. The apparatus of claim 14 wherein the prism assembly is formed using non-adhesive bonding.

16. The apparatus of claim 14 wherein the shim is bonded to the display surface using a glass-to-metal hermetic bond.

17. The apparatus of claim 14 wherein the shim is bonded to the incident surface of the prism assembly using a glass-to-metal hermetic bond.

18. The apparatus of claim 14 wherein the incident surface of the prism is formed to have optical power.

19. The apparatus of claim 1 wherein the shim is a single apertured component.

* * * * *